US007937750B2

(12) United States Patent
Mahalal et al.

(10) Patent No.: US 7,937,750 B2
(45) Date of Patent: May 3, 2011

(54) DRM SYSTEM FOR DEVICES COMMUNICATING WITH A PORTABLE DEVICE

(75) Inventors: Ilan Mahalal, Meudon (FR); Alain Tales, Meudon (FR)

(73) Assignee: Gemalto SA, Meudon (FR)

( * ) Notice: Subject to any disclaimer, the term of this patent is extended or adjusted under 35 U.S.C. 154(b) by 611 days.

(21) Appl. No.: 11/574,556

(22) PCT Filed: Aug. 30, 2005

(86) PCT No.: PCT/IB2005/002564
§ 371 (c)(1),
(2), (4) Date: Nov. 11, 2007

(87) PCT Pub. No.: WO2006/024924
PCT Pub. Date: Mar. 9, 2006

(65) Prior Publication Data
US 2008/0109882 A1    May 8, 2008

(30) Foreign Application Priority Data

Sep. 2, 2004  (EP) .................................... 04292126

(51) Int. Cl.
*G06F 21/00* (2006.01)
*G06F 7/04* (2006.01)
(52) U.S. Cl. ......... 726/9; 726/5; 726/6; 726/7; 455/410; 455/411; 705/55; 705/59
(58) Field of Classification Search .................. 726/7, 9, 726/29
See application file for complete search history.

(56) References Cited

U.S. PATENT DOCUMENTS

| 5,761,309 A * | 6/1998 | Ohashi et al. .................. 713/156 |
| 7,231,371 B1 * | 6/2007 | Cantini et al. .................. 705/65 |
| 7,734,922 B2 * | 6/2010 | Lee et al. ...................... 713/171 |
| 2002/0183985 A1 * | 12/2002 | Hori et al. ......................... 703/1 |

(Continued)

FOREIGN PATENT DOCUMENTS

EP    1176757 A    1/2002

(Continued)

OTHER PUBLICATIONS

PCT/IB2005/002564 International Search Report, Jan. 19, 2006, European Patent Office, P.B. 5818 Patentlaan 2 NL-2280 HV Rijswijk. Whole document.

(Continued)

*Primary Examiner* — Taghi T Arani
*Assistant Examiner* — Thaddeus Plecha
(74) *Attorney, Agent, or Firm* — Pehr B. Jansson; The Jansson Firm

(57) ABSTRACT

Access of a first device, communicating with a second, portable device, to digital content is controlled by authentication of the first device by a remote server; upon successful authentication of the first device by the remote server, securely providing by the remote server credentials to the portable device, the credentials enabling the portable device to authenticate the first device; securely providing by the remote server rights objects to the portable device, the rights objects comprising usage rights and information which is necessary to access the content; authentication of the first device by the portable device using the credentials received from the remote server; and, upon successful authentication of the first device by the portable device, delivering by the portable device to the first device the information which is necessary to access the content.

18 Claims, 1 Drawing Sheet

U.S. PATENT DOCUMENTS

| | | | |
|---|---|---|---|
| 2003/0009681 A1* | 1/2003 | Harada et al. | 713/193 |
| 2003/0012403 A1* | 1/2003 | Rhoads et al. | 382/100 |
| 2003/0079133 A1* | 4/2003 | Breiter et al. | 713/182 |
| 2004/0148523 A1 | 7/2004 | Lambert | |
| 2004/0157584 A1 | 8/2004 | Bensimon | |
| 2004/0215909 A1* | 10/2004 | Imai et al. | 711/163 |

FOREIGN PATENT DOCUMENTS

| | | |
|---|---|---|
| EP | 1237323 A | 9/2002 |
| WO | WO01/13198 A | 2/2001 |
| WO | WO2004/017664 A | 2/2004 |

OTHER PUBLICATIONS

PCT/IB2005/002564 Written Opinion of the International Searching Authority, Jan. 19, 2006, European Patent Office, D-80298 Munich. Whole document.

* cited by examiner

DRM SYSTEM FOR DEVICES COMMUNICATING WITH A PORTABLE DEVICE

BACKGROUND OF THE INVENTION

1. Field of the Invention

The present invention generally relates to Digital Rights Management (DRM) in devices communicating with portable devices, and more specifically to a mechanism that allows a Rights Issuer to be sure that his conditions for access to digital content by a device communicating with a portable device are enforced.

"Digital Rights Management" (DRM) is a set of technologies that provides the means to control the distribution and consumption of the digital media and other digital content. It allows content providers to define conditional access to the content. Examples for such conditions are "the content may only be rendered if it has not yet been rendered more than x times" or "the content may be rendered if the current date is between day y and day z".

A DRM system enables "Content Issuers" to distribute protected content and "Rights Issuers" to issue to a user rights objects comprising the conditions for access to or usage of the delivered protected media (usage rights), which may contain permissions and/or constraints. The protection of the content is usually achieved by encryption. The decryption key or any other information necessary to access the content is also comprised by the rights objects.

Most DRM systems rely on trusted hardware. While protected (encrypted) content may be freely distributed, rights objects comprising the information necessary to access the content (e.g. the decryption keys) are only delivered to devices which are believed to be "DRM compliant", which means that (1) the device accesses the content only if the access is covered by the usage rights comprised by the rights object, and 2 content cannot be extracted from the device and distributed to others in unprotected form, e.g. decrypted.

The type of content referred to by the examples of this document is broadcast video content. However, the invention can be applied to any type of digital content. Furthermore, in the examples of this document, the device accessing the digital content is a mobile telephone, and the portable device with which the device accessing the content communicates is a smart card. Smart cards are intrinsically secure computing platforms ideally suited for providing enhanced security and privacy functionality to applications. At the same time, they provide an isolated processing facility capable of using this information without exposing it within the host environment. They are therefore ideal candidates for trusted, DRM compliant devices. However, the invention can equally be applied to any other device accessing digital content like e.g. a PDA, a PC, or a consumer electronics device with multimedia rendering capabilities, and to any other portable device, like e.g. a Multi Media Memory card.

2. Background Art

Conditional access is enabled today in set-top boxes, which are used to perform the deciphering of video streams to be displayed on a TV set. Furthermore, smart cards are used in the set-top boxes which facilitate conditional access in pay TV. The smart card helps to identify the user and to attribute to the user conditional access rights for TV channels or video on demand.

Rendering streamed or broadcast video now is also enabled on mobile devices like mobile phones or PDAs (mobile handsets hereafter). The handsets receive the video using the DVB-H (Digital Video Broadcasting-Handheld) technology for video broadcast, or other streaming video technologies that are available on fast UMTS communication channels.

There is a growing need for DRM systems in the mobile industry to enable operators and content providers to make digital content available to consumers in a controlled manner. As we will see below, smart cards can play a role in managing conditional access in video broadcast for handsets, as they do already today in Pay TV using set-top boxes. The handset may already be connected to a smart card like a SIM (Subscriber Identity Module) used in GSM.

In some DRM solutions that apply to mobile handsets, i.e. OMA (Open Mobile Alliance) DRM, a Rights Issuer can authenticate a handset as DRM compliant. Only after successful authentication the Rights Issuer delivers rights objects to the handset. The rights objects then are stored and managed on the handset.

Within such a solution, rights objects are associated with a device (the handset), and not with a user. This means that if the user changes handset he has to ask the Rights Issuer to install the rights objects again—on the new device.

This problem is overcome if the rights objects are stored and managed on the smart card communicating with the device. Since the smart card usually is personalized, the rights objects can be associated directly with the user identity. Portability of the rights objects when using other handsets is facilitated. Furthermore, if the smart card is hacked, a new generation of smart cards with new security features can be deployed very rapidly, for little extra costs. It is far cheaper to replace the smart card than to replace the handset.

However, the Rights Issuers are interested in that the smart card makes sure that a handset can be trusted before passing on to it decryption keys or entire rights objects to enable the handset to render the content. The smart card and the handset together have to provide the same level of trust as or a better level of trust than a trusted handset alone.

The approach of existing set-top boxes, where communication between the set-top box and the smart card is channeled by proprietary software/hardware which ensures that the box can be trusted, cannot be adopted in the mobile communications world, where any smart card has to be able to cooperate with the handsets of any manufacturer, because the smart card does not know which device is trusted by the Rights Issuer.

SUMMARY OF THE INVENTION

It is therefore an object of the invention to provide a method to solve the problems outlined above. This object is achieved by the method, the devices, and the system as defined in independent claims 1, 10, 12, 14, and 15. Further preferred embodiments are defined in the dependent claims.

According to a preferred embodiment of the invention, the object is achieved by a method for controlling access of a first device to digital content, the first device communicating with a second, portable device, the method comprising:

authentication of the first device by a remote server;

upon successful authentication of the first device by the remote server, securely providing by the remote server credentials to the portable device, the credentials enabling the portable device to authenticate the first device;

securely providing by the remote server rights objects to the portable device, the rights objects comprising usage rights and information which is necessary to access the content;

authentication of the first device by the portable device using the credentials received from the remote server; and upon successful authentication of the first device by the portable device, delivering by the portable device to the first device the information which is necessary to access the content.

As outlined above, storing the rights object on the portable device instead of the first device has the advantage that the rights objects can also be used when the portable device is connected to another rendering device different from the first device. Moreover, authentication of the first device by the remote server and subsequently providing credentials to the portable device for authentication of the first device by the portable device has the advantage that the portable device is able to authenticate the first device as DRM compliant, although initially no information about the DRM compliance of the first device is stored on the portable device.

According to a further preferred embodiment of the invention, credentials which are securely stored on the first device are used for authentication of the first device by the remote server and the credentials are used, together with the credentials provided to the portable device by the remote server, for authentication of the first device by the portable device.

The use of credentials securely stored on the first device ensures that the first device can be securely and correctly authenticated.

According to a further preferred embodiment of the invention, credentials which are securely stored on the portable device are used by the remote server for securely providing to the portable device the credentials that enable the portable device to authenticate the first device and for securely providing to the portable device the rights objects.

Credentials stored securely on the portable device can advantageously be used to ensure that the credentials that enable the portable device to authenticate the first device and the rights objects are sent to the correct recipient and can only be read by the correct recipient.

According to a further preferred embodiment of the invention, the first device delivers to the portable device information about the intended usage of the content and the portable device delivers to the first device the information which is necessary to access the content only if the intended usage is covered by the usage rights comprised by the rights objects.

This has the advantage that the portable device can check if the access conditions comprised by the usage rights are met for the intended usage. Furthermore, the usage rights do not have to be transmitted to or stored on the first device.

According to another preferred embodiment of the invention, together with the information which is necessary to access the content at least parts of the usage rights comprised by the rights objects are delivered to the first device by the portable device and the first device accesses the content only if the intended usage is covered by the usage rights delivered to the first device.

This has the advantage that existing media players in the first device which comprise "DRM agents" examining the usage rights for verifying if the access conditions are met can be reused even if the rights objects are stored on the portable device.

According to a further preferred embodiment of the invention, the first device is a mobile telephone, a PDA, a PC, or a consumer electronics device with multimedia and networking capabilities.

According to a further preferred embodiment of the invention, the portable device is a smart card or a Multi Media Memory card.

According to a further preferred embodiment of the invention, the rights objects facilitate access to protected broadcast or streaming video media or to protected digital media that has previously been delivered to the first device.

Another preferred embodiment of the invention is a computer program element comprising computer code means to enable a device to perform the actions of the first device in the method outlined above.

Another preferred embodiment of the invention is a device capable of rendering digital content and comprising a computer program element as stated in the preceding paragraph.

Another preferred embodiment of the invention is a computer program element comprising computer code means to enable a portable device to perform the actions of the portable device in the method outlined above.

Another preferred embodiment of the invention is a portable device capable of storing rights objects and comprising a computer program element as stated in the preceding paragraph.

Another preferred embodiment of the invention is a computer program element comprising computer code means to enable a server to perform the actions of the remote server in the method outlined above.

Another preferred embodiment of the invention is a server capable of issuing rights objects and comprising a computer program element as stated in the preceding paragraph.

Another preferred embodiment of the invention is a system comprising a first device as stated above, a portable device as stated above and a server as stated above.

BRIEF DESCRIPTION OF THE DRAWINGS

The foregoing and other objects, aspects and advantages of the invention will be better understood from the following detailed description of the preferred embodiments of the invention made with reference to the drawings, in which.

DETAILED DESCRIPTION OF A PREFERRED EMBODIMENT OF THE INVENTION

Figure 1:
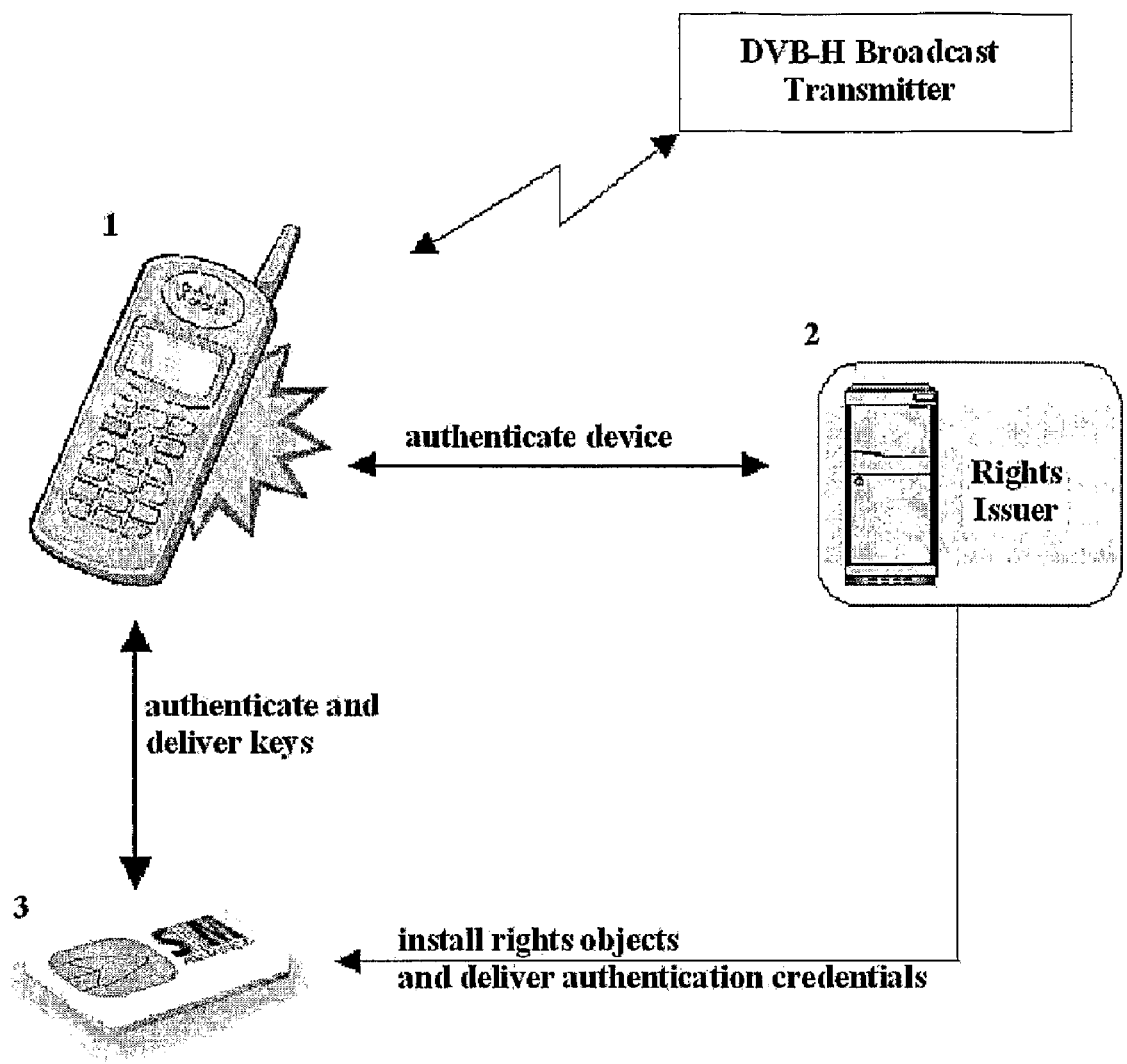
FIG. 1 is a schematic diagram showing the entities participating in the method according to the invention and the communication channels established between them.

Referring now to the drawings, FIG. 1 shows an embodiment of the invention which is a system comprising a first device 1, in the case of FIG. 1 a DRM compliant mobile handset, communicating with a portable device 3, in the case of FIG. 1 an embedded smart card, and a remote server 2, which in the case of FIG. 1 is a server of a Rights Issuer, in the following simply called Rights Issuer 2.

The mobile handset is equipped with a DVB-H reception module enabling it to receive digital video broadcasts from a content provider. The video stream is protected by encryption and the handset needs to get the decryption keys in order to be able to render to the user each consecutive video stream block.

The user can acquire the right to watch the video stream from the Rights Issuer 2. The Rights Issuer 2 securely delivers rights objects to the smart card 3. The smart card 3 extracts the decryption keys from the rights objects and delivers, if it has been able to authenticate the handset 1 as DRM compliant, the decryption keys to the handset 1 for decryption of the video stream.

"Securely" delivering rights objects to the smart card 3 requires that there is a secure communication channel between the Rights Issuer 2 and the smart card 3. Although the smart card 3, which is embedded into the handset 1, needs the handset 1 to communicate with the Rights Issuer 2, such a secure channel, which cannot be eavesdropped by the handset 1, can be established: for example, all confidential information, like the rights objects, may be encrypted in a way that only the smart card 3 can decrypt it. The smart card 3 might be assigned a private/public key pair and the Rights Issuer 2 encrypts the information using the public key of the smart card 3. Only the smart card 3 can decrypt the information, using its private key. In addition to the key pair, a certificate or other credentials might be securely stored on the smart card 3 which play a role in the protocol establishing the secure communication channel.

As stated above, the smart card 3 as such initially comprises no information based on which it could identify the handset 1 as DRM compliant or trusted by the Rights Issuer 2. The decision if a handset 1 can be trusted is entirely up to the Rights Issuer 2. Any information stored on the smart card 3 in the fabric could be out-of-date, because new devices might be brought to the market or a security leak might be discovered in a device model resulting in the device 1 not being trusted any more. Therefore, the Rights Issuer 2 will provide the smart card 3 with information allowing the smart card to authenticate the handset 1 as DRM compliant as follows:

First, the Rights Issuer 2 authenticates the handset 1. For example, OMA compliant handsets have a private/public key pair and a device certificate. The handset sends the device certificate to the Rights Issuer 2. The Rights Issuer issues a challenge to the handset 1 which the handset signs with its private key. The Rights Issuer 2 can then verify if the certificate is satisfactory and if the signature corresponds to the sent device certificate.

If the Rights Issuer 2 determines that the handset 1 is DRM compliant, it sends credentials to the smart card 3 allowing the smart card to authenticate the handset. These credentials could be, e.g., the device certificate of the handset 1. The credentials are sent to the smart card via the same secure communication channel as the rights objects, i.e. the credentials might be encrypted using the public key assigned to the smart card 3. Furthermore, there must be a mechanism that the smart card can be sure that the credentials have been sent by the Rights Issuer 2 and not, e.g., by a malicious handset. This could be achieved by signing a message to be sent by the Rights Issuer 2 using a private key assigned to the Rights Issuer.

The smart card 3 can then use the credentials received by the Rights Issuer 2 to authenticate the handset 1. It will deliver to the handset 1 the information comprised by the rights objects which is necessary to access the video content only if the authentication has been successful.

For example, when the user uses the video media player to render video broadcast the media player tries to get the necessary decryption keys for each video stream block. It opens a communication channel with the smart card 3 in which the smart card first authenticates the handset. The smart card 3 sends a challenge to the handset 1 which the handset media player signs with the private key of the handset. The smart card 3 then verifies if the signature corresponds to the stored device certificate. Only if the signature is correctly validated the smart card delivers the necessary decryption keys to the handset media player in the started communication session.

Note that the step of delivering the rights objects to the smart card 3 by the Rights Issuer 2 described above does not necessarily have to be carried out at the beginning of the method according to the invention. The rights objects can rather be delivered to the smart card 3 at any time before the step of delivering the information which is necessary to access the content (e.g. the decryption keys) comprised by the rights objects to the handset 1.

As mentioned above, in addition to the information which is necessary to access the content, the rights objects comprise usage rights which can be, e.g., permissions and/or constraints. Note that the usage rights do not have to be comprised explicitly by a rights object but also can be expressed implicitly by delivering the plain decryption key. In this case, the rights object may be interpreted e.g. to convey default usage rights.

In principle, it can be verified either on the smart card 3 or on the handset 1 if the usage intended by the handset is covered (allowed) by the usage rights comprised by the rights objects. In the first case, the handset media player might extract some encoding information from the video stream giving hints about the intended usage and send it to the smart card 3. The smart card then compares this information with the usage rights comprised by the received rights objects and delivers the decryption keys to the handset 1 only if the usage rights are sufficient. In the second case, the smart card 1 delivers the entire rights objects comprising the usage rights, or at least parts of the usage rights to the handset 1, the handset performing the verification if the usage rights are sufficient for the intended usage.

If the smart card 3 is moved to another handset the credentials that are provisioned in the card will not match the new handset credentials and the authentication will fail. If the new handset is a DRM compliant handset it will alert the Rights Issuer 2, who will start an authentication session with the new handset to validate if it is considered trusted. If the authentication succeeds the Rights Issuer 2 will provide the new handset credentials to the smart card. Such a new authentication of the handset is only necessary when the user changes his handset. The rights objects can be stored securely in the smart card 3 and therefore have to be provided only once. They are portable to any DRM compliant handset.

The present invention is of course not limited to video content. The invention rather extends to any kind of digital content, regardless if the content is streaming content which is decrypted "on the fly" while parts of the content still have to be received, or if the content is entirely received by the device before the content is decrypted or before the method according to the invention is applied. Furthermore, the method according to the invention is applicable to content received by any means, like broadcast over the air (e.g. using the DVB-H standard), download via an UMTS connection, download via cable etc.

The invention claimed is:

1. A method for controlling access of a first device to digital content, the first device communicating with a second, portable device, the method comprising:
   authentication of the first device by a remote server including verifying the first device as having the authority to access digital content according to a defined policy;
   upon successful authentication of the first device by the remote server, securely providing by the remote server first credentials to the portable device, the first credentials enabling the portable device to authenticate the first device;
   securely providing by the remote server rights objects to the portable device, the rights objects comprising usage rights and information which is necessary to access the content;
   authentication of the first device by the portable device using the first credentials received from the remote server; and upon successful authentication of the first device by the portable device, delivering by the portable device to the first device the information which is necessary to access the content;

wherein the portable device is a smart card or a Multi Media Memory card connected to the first device.

2. The method according to claim 1, wherein second credentials, which are securely stored on the first device, are used for authentication of the first device by the remote server and the second credentials are used together with the first credentials provided to the portable device by the remote server for authentication of the first device by the portable device.

3. The method according to claim 2, wherein the first credentials which are securely stored on the portable device are used by the remote server for securely providing to the portable device the second credentials that enable the portable device to authenticate the first device and for securely providing to the portable device the rights objects.

4. The method according to claim 1 or 2, wherein the first device delivers to the portable device information about the intended usage of the content and the portable device delivers to the first device the information which is necessary to access the content only if the intended usage is covered by the usage rights comprised by the rights objects.

5. The method according to claim 1 or 2, wherein together with the information which is necessary to access the content at least part of the usage rights comprised by the rights objects are delivered to the first device by the portable device and the first device accesses the content only if the intended usage is covered by the usage rights delivered to the first device.

6. The method according to claim 1, wherein the first device is a mobile telephone, a PDA, a PC, or a consumer electronics device with multimedia and networking capabilities.

7. The method according to claim 1, wherein the rights objects facilitate access to protected broadcast or streaming video media or to protected digital media that has previously been delivered to the first device.

8. A non-transitory computer readable storage device comprising a computer program element, executable on a first device for controlling access to digital content by the first device, the computer program element including instructions to cause the first device to perform the actions of the first device in a method having the steps:
   authentication of the first device by a remote server including verifying the first device as having the authority to access digital content according to a defined policy;
   upon successful authentication of the first device by the remote server, securely providing by the remote server first credentials to a portable device, wherein the portable device is a smart card or a Multi Media Memory card connected to the first device, the first credentials enabling the portable device to authenticate the first device;
   securely providing by the remote server rights objects to the portable device, the rights objects comprising usage rights and information which is necessary to access the content;
   authentication of the first device by the portable device using the first credentials received from the remote server; and
   upon successful authentication of the first device by the portable device, delivering by the portable device to the first device the information which is necessary to access the content.

9. A first device comprising:
a means to render digital content; and
a non-transitory computer readable storage device comprising a computer program element, executable on the first device for controlling access to the digital content by the first device, the computer program element including instructions to cause the first device to perform the actions of the first device in a method having the steps:
   authentication of the first device by a remote server including verifying the first device as having the authority to access digital content according to a defined policy;
   upon successful authentication of the first device by the remote server, securely providing by the remote server first credentials to a portable device, wherein the portable device is a smart card or a Multi Media Memory card connected to the first device, the first credentials enabling the portable device to authenticate the first device;
   securely providing by the remote server rights objects to the portable device, the rights objects comprising usage rights and information which is necessary to access the content;
   authentication of the first device by the portable device using the first credentials received from the remote server; and
   upon successful authentication of the first device by the portable device, delivering by the portable device to the first device the information which is necessary to access the content.

10. A non-transitory computer readable storage device comprising a computer program element, executable on a portable device, wherein the portable device is a smart card or Multi Media Memory card connected to a first device, for controlling access to digital content by the first device, the computer program element including instructions to cause the portable device to perform the actions of the portable device in a method having the steps:
   authentication of the first device by a remote server including verifying the first device as having the authority to access digital content according to a defined policy;
   upon successful authentication of the first device by the remote server, securely providing by the remote server first credentials to the portable device, the first credentials enabling the portable device to authenticate the first device;
   securely providing by the remote server rights objects to the portable device, the rights objects comprising usage rights and information which is necessary to access the content;
   authentication of the first device by the portable device using the first credentials received from the remote server; and
   upon successful authentication of the first device by the portable device, delivering by the portable device to the first device the information which is necessary to access the content.

11. A non-transitory computer readable storage device comprising a computer program element, executable on a server for controlling access to digital content by a first device, the computer program element including instructions to cause the server to perform the actions of a remote server in a method having the steps:

authentication of the first device by the remote server including verifying the first device as having the authority to access digital content according to a defined policy;
upon successful authentication of the first device by the remote server, securely providing by the remote server first credentials to a portable device, wherein the portable device is a smart card or a Multi Media Memory card connected to the first device, the first credentials enabling the portable device to authenticate the first device;
securely providing by the remote server rights objects to the portable device, the rights objects comprising usage rights and information which is necessary to access the content;
authentication of the first device by the portable device using the first credentials received from the remote server; and
upon successful authentication of the first device by the portable device, delivering by the portable device to the first device the information which is necessary to access the content.

12. A server comprising:
a means for issuing rights objects; and
a non-transitory computer readable storage device having a computer program element, executable on a server for controlling access to digital content by a first device, the computer program element including instructions to cause the server to perform the actions of a remote server in a method having the steps:
authentication of the first device by the remote server including verifying the first device as having the authority to access digital content according to a defined policy;
upon successful authentication of the first device by the remote server, securely providing by the remote server first credentials to a portable device, wherein the portable device is a smart card or a Multi Media Memory card connected to the first device, the first credentials enabling the portable device to authenticate the first device;
securely providing by the remote server rights objects to the portable device, the rights objects comprising usage rights and information which is necessary to access the content;
authentication of the first device by the portable device using the first credentials received from the remote server; and
upon successful authentication of the first device by the portable device, delivering by the portable device to the first device the information which is necessary to access the content.

13. A system comprising a first device, a portable device and a remote server wherein each of the first device, the portable device and the remote server comprise a non-transitory computer readable storage device comprising a computer program element programmed to perform the steps of the first device, the portable device, and the remote server, respectively, in a method having the steps:
authentication of the first device by the remote server including verifying the first device as having the authority to access digital content according to a defined policy;
upon successful authentication of the first device by the remote server, securely providing by the remote server first credentials to the portable device, wherein the portable device is a smart card or a Multi Media Memory card connected to the first device, the first credentials enabling the portable device to authenticate the first device;
securely providing by the remote server rights objects to the portable device, the rights objects comprising usage rights and information which is necessary to access the content;
authentication of the first device by the portable device using the first credentials received from the remote server; and
upon successful authentication of the first device by the portable device, delivering by the portable device to the first device the information which is necessary to access the content.

14. A portable device comprising:
a storage means for storing rights objects; and
a non-transitory computer readable storage device having a computer program element, executable on the portable device, wherein the portable device is a smart card or a Multi Media Memory card connected to a first device, for controlling access to digital content by the first device, the computer program element including instructions to cause the portable device to perform the actions of the portable device in a method having the steps:
authentication of the first device by a remote server including verifying the first device as having the authority to access digital content according to a defined policy;
upon successful authentication of the first device by the remote server, securely providing by the remote server first credentials to the portable device, the first credentials enabling the portable device to authenticate the first device;
securely providing by the remote server rights objects to the portable device, the rights objects comprising usage rights and information which is necessary to access the content;
authentication of the first device by the portable device using the first credentials received from the remote server; and
upon successful authentication of the first device by the portable device, delivering by the portable device to the first device the information which is necessary to access the content.

15. The method of claim 1, wherein verifying the first device as having the authority to access digital content according to a defined policy comprises verifying that the device is DRM Compliant.

16. The non-transitory computer readable storage device of claim 8, wherein verifying the first device as having the authority to access digital content according to a defined policy comprises verifying that the device is DRM Compliant.

17. The non-transitory computer readable storage device of claim 10, wherein verifying the first device as having the authority to access digital content according to a defined policy comprises verifying that the device is DRM Compliant.

18. The non-transitory computer readable storage device of claim 11, wherein verifying the first device as having the authority to access digital content according to a defined policy comprises verifying that the device is DRM Compliant.

* * * * *